United States Patent
Apte et al.

(10) Patent No.: US 10,776,282 B2
(45) Date of Patent: Sep. 15, 2020

(54) HOME AGENT BASED CACHE TRANSFER ACCELERATION SCHEME

(71) Applicant: Advanced Micro Devices, Inc., Sunnyvale, CA (US)

(72) Inventors: Amit P. Apte, Austin, TX (US); Ganesh Balakrishnan, Austin, TX (US); Vydhyanathan Kalyanasundharam, San Jose, CA (US); Kevin M. Lepak, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 371 days.

(21) Appl. No.: 15/844,215

(22) Filed: Dec. 15, 2017

(65) Prior Publication Data
US 2019/0188155 A1 Jun. 20, 2019

(51) Int. Cl.
*G06F 12/128* (2016.01)
*G06F 12/0817* (2016.01)
(Continued)

(52) U.S. Cl.
CPC .......... *G06F 12/128* (2013.01); *G06F 12/082* (2013.01); *G06F 12/0824* (2013.01);
(Continued)

(58) Field of Classification Search
CPC ..... G06F 12/082; G06F 12/0817–0828; G06F 12/0862
See application file for complete search history.

(56) References Cited

U.S. PATENT DOCUMENTS 6,631,401 B1 10/2003 Keller et al.
7,627,722 B2 12/2009 Alsup
(Continued)

FOREIGN PATENT DOCUMENTS

CN 104331377 2/2015

OTHER PUBLICATIONS

International Search Report and Written Opinion for International Application No. PCT/US2018/051756, filed Sep. 19, 2018, 13 pages.
(Continued)

*Primary Examiner* — Larry T Mackall
*Assistant Examiner* — Michelle T Bechtold
(74) *Attorney, Agent, or Firm* — Kowert Hood Munyon Rankin and Goetzel PC; Rory D. Rankin (57) ABSTRACT

Systems, apparatuses, and methods for implementing a speculative probe mechanism are disclosed. A system includes at least multiple processing nodes, a probe filter, and a coherent slave. The coherent slave includes an early probe cache to cache recent lookups to the probe filter. The early probe cache includes entries for regions of memory, wherein a region includes a plurality of cache lines. The coherent slave performs parallel lookups to the probe filter and the early probe cache responsive to receiving a memory request. An early probe is sent to a first processing node responsive to determining that a lookup to the early probe cache hits on a first entry identifying the first processing node as an owner of a first region targeted by the memory request and responsive to determining that a confidence indicator of the first entry is greater than a threshold.

20 Claims, 6 Drawing Sheets

(51) Int. Cl.
    *G06F 12/0831*    (2016.01)
    *G06F 12/0891*    (2016.01)
(52) U.S. Cl.
    CPC ...... *G06F 12/0826* (2013.01); *G06F 12/0833* (2013.01); *G06F 12/0891* (2013.01); *G06F 2212/1024* (2013.01); *G06F 2212/507* (2013.01); *G06F 2212/62* (2013.01)

(56) References Cited

U.S. PATENT DOCUMENTS

| | | | |
|---|---|---|---|
| 2002/0087811 A1* | 7/2002 | Khare | G06F 12/0817 |
| | | | 711/146 |
| 2006/0101209 A1* | 5/2006 | Lais | G06F 12/082 |
| | | | 711/137 |
| 2009/0327616 A1 | 12/2009 | Conway et al. | |
| 2014/0052917 A1* | 2/2014 | Koka | G06F 12/1027 |
| | | | 711/120 |
| 2016/0117250 A1 | 4/2016 | Lee et al. | |
| 2017/0177484 A1 | 6/2017 | Conway | |

OTHER PUBLICATIONS

International Search Report and Written Opinion in International Application No. PCT/US2018/051756, dated Dec. 19, 2018, 13 pages.

* cited by examiner

HOME AGENT BASED CACHE TRANSFER ACCELERATION SCHEME

BACKGROUND

Description of the Related Art

Computer systems use main memory that is typically formed with inexpensive and high density dynamic random access memory (DRAM) chips. However DRAM chips suffer from relatively long access times. To improve performance, data processors typically include at least one local, high-speed memory known as a cache. In a multi-core data processor, each data processor core can have its own dedicated level one (L1) cache, while other caches (e.g., level two (L2), level three (L3)) are shared by data processor cores.

Cache subsystems in a computing system include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block is varied according to design choice, and can be of any size. In addition, each of the terms "cache tag", "cache line tag", and "cache block tag" is interchangeable.

In multi-node computer systems, special precautions must be taken to maintain coherency of data that is being used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol, each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

Transferring data between the cache subsystem of a first node to the cache subsystem of a second node typically involves multiple operations, with each operation contributing to the latency of the transfer. These operations are typically performed in a serial fashion, with one operation starting when the previous operation ends.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing a speculative probe mechanism are disclosed herein. In one embodiment, a system includes at least a plurality of processing nodes (e.g., central processing units (CPUs)), an interconnect fabric, a coherent slave, a probe filter, a memory controller, and a memory. Each processing node includes one or more processing units. The type of processing unit(s) ((e.g., general purpose processor, graphics processing unit (GPU), application specific integrated circuit (ASIC), field programmable gate array (FPGA), digital signal processor (DSP)) included in each processing node can vary from embodiment to embodiment and from node to node. The coherent slave is coupled to the plurality of processing nodes via the interconnect fabric, and the coherent slave is also coupled to the probe filter and the memory controller.

The coherent slave includes an early probe cache to cache recent lookups to the probe filter. In one embodiment, recent lookups to the probe filter for shared pages are cached in the early probe cache. The information on whether a page is shared or private is available as part of the probe filter lookup. In one embodiment, the early probe cache stores entries on a region basis, wherein a region includes a plurality of cache lines. The coherent slave receives memory requests from processing nodes via the interconnect fabric. In response to receiving a memory request from a given processing node via the fabric, the coherent slave performs parallel lookups to the probe filter and the early probe cache. If a lookup to the early probe cache matches on a given entry, the coherent slave retrieves an identifier (ID) of the region owner and a confidence indicator from the given entry. If the confidence indicator is greater than a programmable threshold, then the coherent slave sends an early probe to the processing node identified as the region owner. It is noted that the early probe is sent prior to a lookup to the probe filter completing. This helps to reduce the latency of retrieving data from a target processing node when the early probe is sent to the correct target.

When the lookup to the probe filter completes, and if the lookup results in a hit, then the coherent slave retrieves an ID of the owner of the cache line from a matching entry. If the owner of the cache line targeted by the memory request matches the owner of the region obtained from the early probe cache, then the coherent slave increments the confidence indicator of the corresponding entry in the early probe cache. Depending on the embodiment, the coherent slave can send or not send a demand probe to the owner. If the early probe sent to the target processing node causes the targeted data to be returned to the requesting node, then the coherent slave does not need to send the demand probe. Otherwise, if the early probe causes the targeted data to be pulled out of the cache subsystem of the requesting node, then a demand probe can be sent to the target node to return the data to the requesting node. If the owner of the cache line targeted by the memory request and retrieved from the probe filter does not match the owner of the region obtained from the early probe cache, then the coherent slave decrements the confidence indicator of the corresponding entry in the early probe cache. Also, the coherent slave sends a demand probe to the correct processing node.

If the lookup to the early probe cache misses and the lookup to the probe filter hits on a shared page, then a new entry is allocated in the early probe cache. The coherent slave determines the region which includes the cache line being targeted by the memory request, and then the coherent slave stores an ID of the region in a region owner field of the new entry in the early probe cache. The coherent slave also initializes the confidence indicator field and LRU field to default values. Accordingly, when subsequent memory requests targeting the same region are received by the coherent slave, lookups to the early probe cache will hit on this new entry, causing early probes to be sent to the node identified as the region owner once the confidence indicator field is greater than the programmable threshold.

Figure 1:
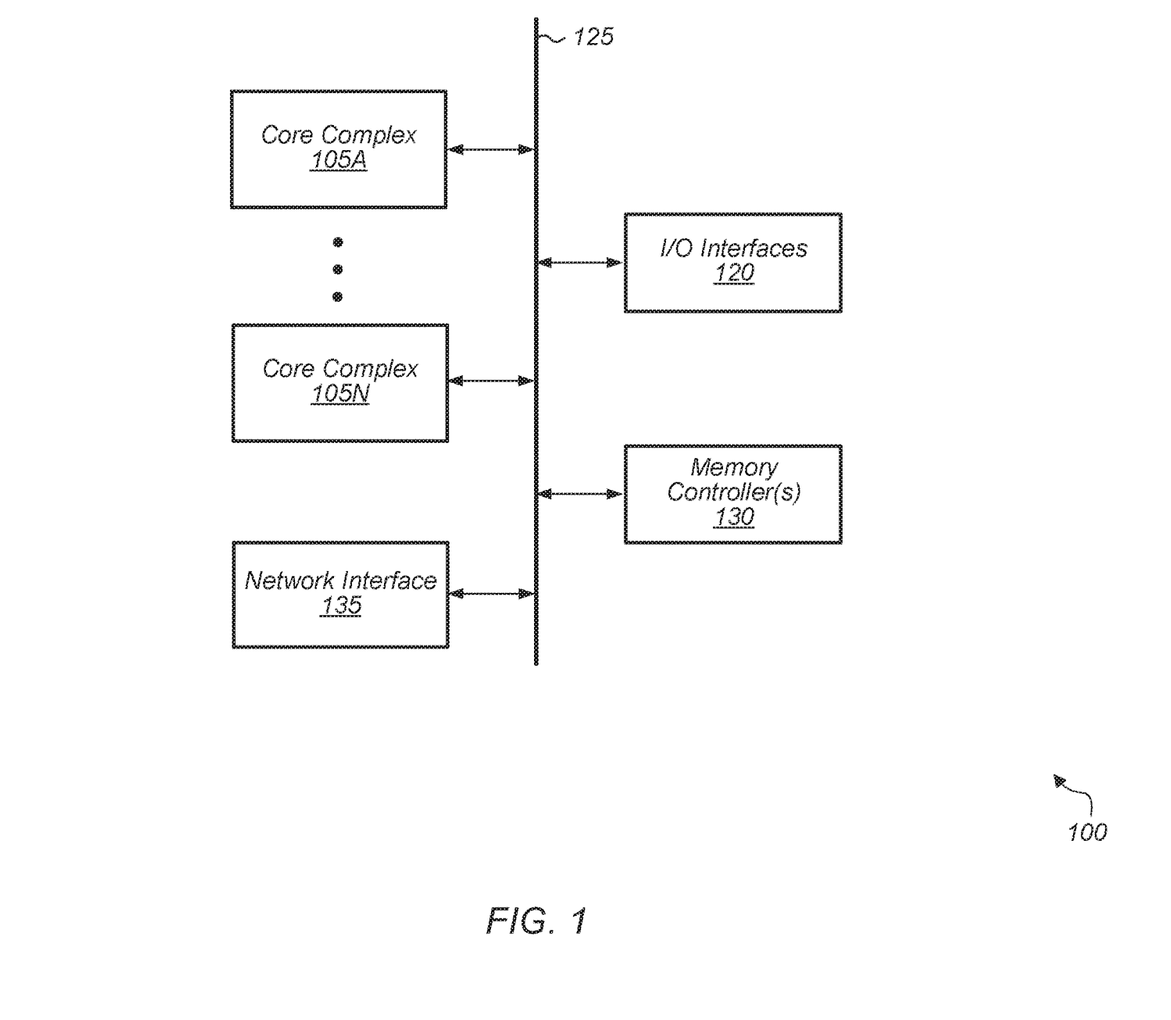
FIG. 1 is a block diagram of one embodiment of a computing system.

Referring now to FIG. 1, a block diagram of one embodiment of a computing system 100 is shown. In one embodiment, computing system 100 includes at least core complexes 105A-N, input/output (I/O) interfaces 120, bus 125, memory controller(s) 130, and network interface 135. In other embodiments, computing system 100 can include other components and/or computing system 100 can be arranged differently. In one embodiment, each core complex 105A-N includes one or more general purpose processors, such as central processing units (CPUs). It is noted that a "core complex" can also be referred to as a "processing node" or a "CPU" herein. In some embodiments, one or more core complexes 105A-N can include a data parallel processor with a highly parallel architecture. Examples of data parallel processors include graphics processing units (GPUs), digital signal processors (DSPs), and so forth. Each processor core within core complex 105A-N includes a cache subsystem with one or more levels of caches. In one embodiment, each core complex 105A-N includes a cache (e.g., level three (L3) cache) which is shared between multiple processor cores.

Memory controller(s) 130 are representative of any number and type of memory controllers accessible by core complexes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a server, computer, laptop, mobile device, game console, streaming device, wearable device, or any of various other types of computing systems or devices. It is noted that the number of components of computing system 100 can vary from embodiment to embodiment. There can be more or fewer of each component than the number shown in FIG. 1. It is also noted that computing system 100 can include other components not shown in FIG. 1. Additionally, in other embodiments, computing system 100 can be structured in other ways than shown in FIG. 1.

Figure 2:
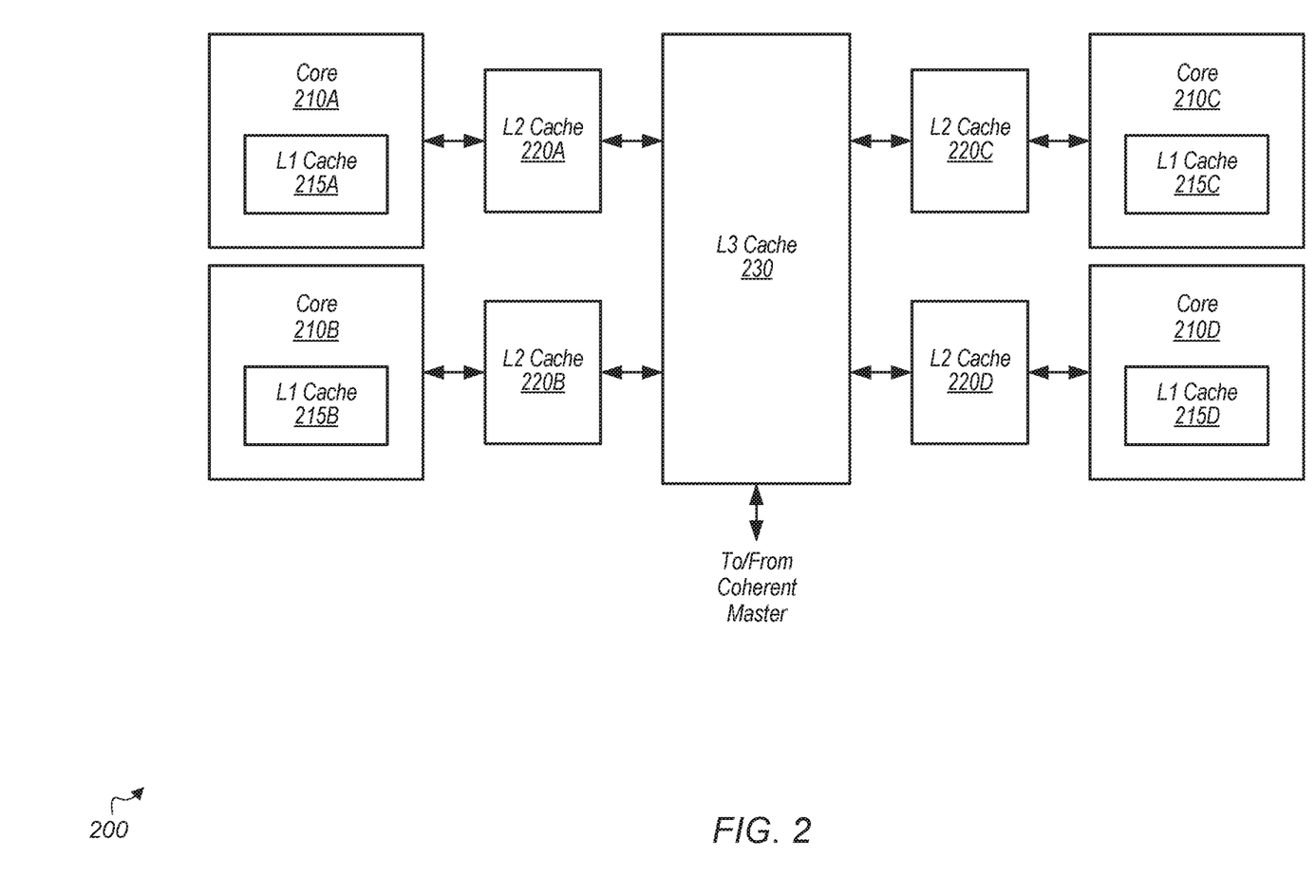
FIG. 2 is a block diagram of one embodiment of a core complex.

Turning now to FIG. 2, a block diagram of one embodiment of a core complex 200 is shown. In one embodiment, core complex 200 includes four processor cores 210A-D. In other embodiments, core complex 200 can include other numbers of processor cores. It is noted that a "core complex" can also be referred to as a "processing node" or "CPU" herein. In one embodiment, the components of core complex 200 are included within core complexes 105A-N (of FIG. 1).

Each processor core 210A-D includes a cache subsystem for storing data and instructions retrieved from the memory subsystem (not shown). For example, in one embodiment, each core 210A-D includes a corresponding level one (L1) cache 215A-D. Each processor core 210A-D can include or be coupled to a corresponding level two (L2) cache 220A-D. Additionally, in one embodiment, core complex 200 includes a level three (L3) cache 230 which is shared by the processor cores 210A-D. L3 cache 230 is coupled to a coherent master for access to the fabric and memory subsystem. It is noted that in other embodiments, core complex 200 can include other types of cache subsystems with other numbers of cache and/or with other configurations of the different cache levels.

Figure 3:
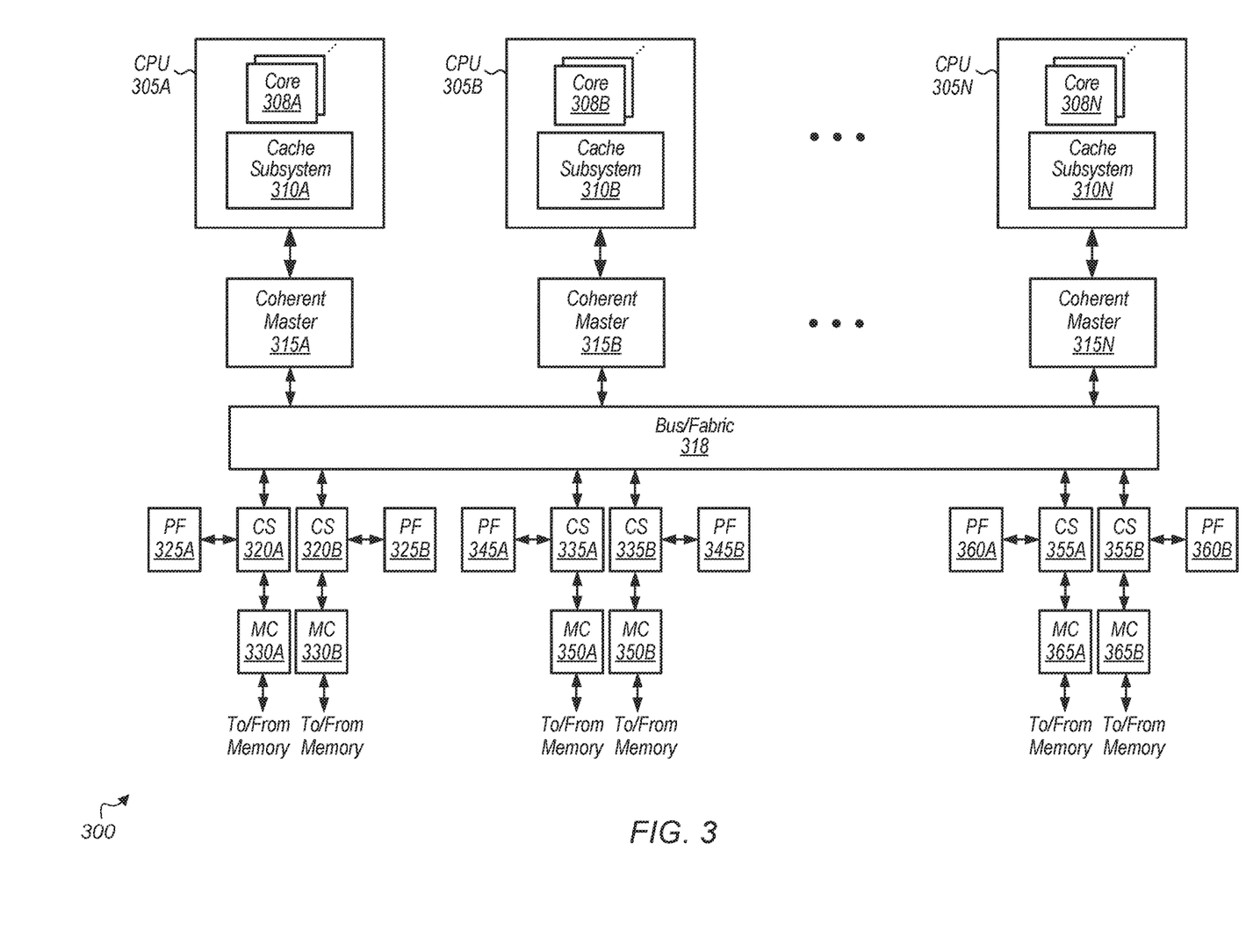
FIG. 3 is a block diagram of one embodiment of a multi-CPU system.

Referring now to FIG. 3, a block diagram of one embodiment of a multi-CPU system 300 is shown. In one embodiment, system includes multiple CPUs 305A-N. The number of CPUs per system can vary from embodiment to embodiment. Each CPU 305A-N can include any number of cores 308A-N, respectively, with the number of cores varying according to the embodiment. Each CPU 305A-N also includes a corresponding cache subsystem 310A-N. Each cache subsystem 310A-N can include any number of levels of caches and any type of cache hierarchy structure.

In one embodiment, each CPU 305A-N is connected to a corresponding coherent master 315A-N. As used herein, a "coherent master" is defined as an agent that processes traffic flowing over an interconnect (e.g., bus/fabric 318) and manages coherency for a connected CPU. To manage coherency, a coherent master receives and processes coherency-related messages and probes and generates coherency-related requests and probes. It is noted that a "coherent master" can also be referred to as a "coherent master unit" herein.

In one embodiment, each CPU 305A-N is coupled to a pair of coherent slaves via a corresponding coherent master 315A-N and bus/fabric 318. For example, CPU 305A is coupled through coherent master 315A and bus/fabric 318 to coherent slaves 320A-B. Coherent slave (CS) 320A is coupled to memory controller (MC) 330A and coherent slave 320B is coupled to memory controller 330B. Coherent slave 320A is coupled to probe filter (PF) 325A, with probe filter 325A including entries for memory regions that have cache lines cached in system 300 for the memory accessible through memory controller 330A. It is noted that probe filter 325A, and each of the other probe filters, can also be referred to as a "cache directory". Similarly, coherent slave 320B is coupled to probe filter 325B, with probe filter 325B including entries for memory regions that have cache lines cached in system 300 for the memory accessible through memory controller 330B. It is noted that the example of having two memory controllers per CPU is merely indicative of one embodiment. It should be understood that in other embodiments, each CPU 305A-N can be connected to other numbers of memory controllers besides two.

In a similar configuration to that of CPU 305A, CPU 305B is coupled to coherent slaves 335A-B via coherent master 315B and bus/fabric 318. Coherent slave 335A is coupled to memory via memory controller 350A, and coherent slave 335A is also coupled to probe filter 345A to manage the coherency of cache lines corresponding to memory accessible through memory controller 350A. Coherent slave 335B is coupled to probe filter 345B and coherent slave 335B is coupled to memory via memory controller 365B. Also, CPU 305N is coupled to coherent slaves 355A-B via coherent master 315N and bus/fabric 318. Coherent slaves 355A-B are coupled to probe filter 360A-B, respectively, and coherent slaves 355A-B are coupled to memory via memory controllers 365A-B, respectively. As used herein, a "coherent slave" is defined as an agent that manages coherency by processing received requests and probes that target a corresponding memory controller. It is noted that a "coherent slave" can also be referred to as a "coherent slave unit" herein. Additionally, as used herein, a "probe" is defined as a message passed from a coherency point to one or more caches in the computer system to determine if the caches have a copy of a block of data and optionally to indicate the state into which the cache should place the block of data.

When a coherent slave receives a memory request targeting its corresponding memory controller, the coherent slave performs parallel lookups to a corresponding early probe cache and to a corresponding probe filter. In one embodiment, each early probe cache in system 300 tracks regions of memory, wherein a region includes a plurality of cache lines. The size of the region being tracked can vary from embodiment to embodiment. It is noted that a "region" can also be referred to as a "page" herein. When a request is received by a coherent slave, the coherent slave determines the region which is targeted by the request. Then a lookup is performed of the early probe cache for this region in parallel with performing a lookup to the probe filter. The lookup to the early probe cache will typically complete several cycles before the lookup to the probe filter. If the lookup to the early probe cache results in a hit, then the coherent slave sends an early probe to the CPU(s) which are identified in the hit entry. This facilitates an early retrieval of the data in cases when the early probe cache identifies the correct target, and reduces the latency associated with processing memory requests. It is noted that in other embodiments there can be other connections from bus/fabric 318 to other components not shown to avoid obscuring the figure. For example, in another embodiment, bus/fabric 318 includes connections to one or more I/O interfaces and one or more I/O devices.

Figure 4:
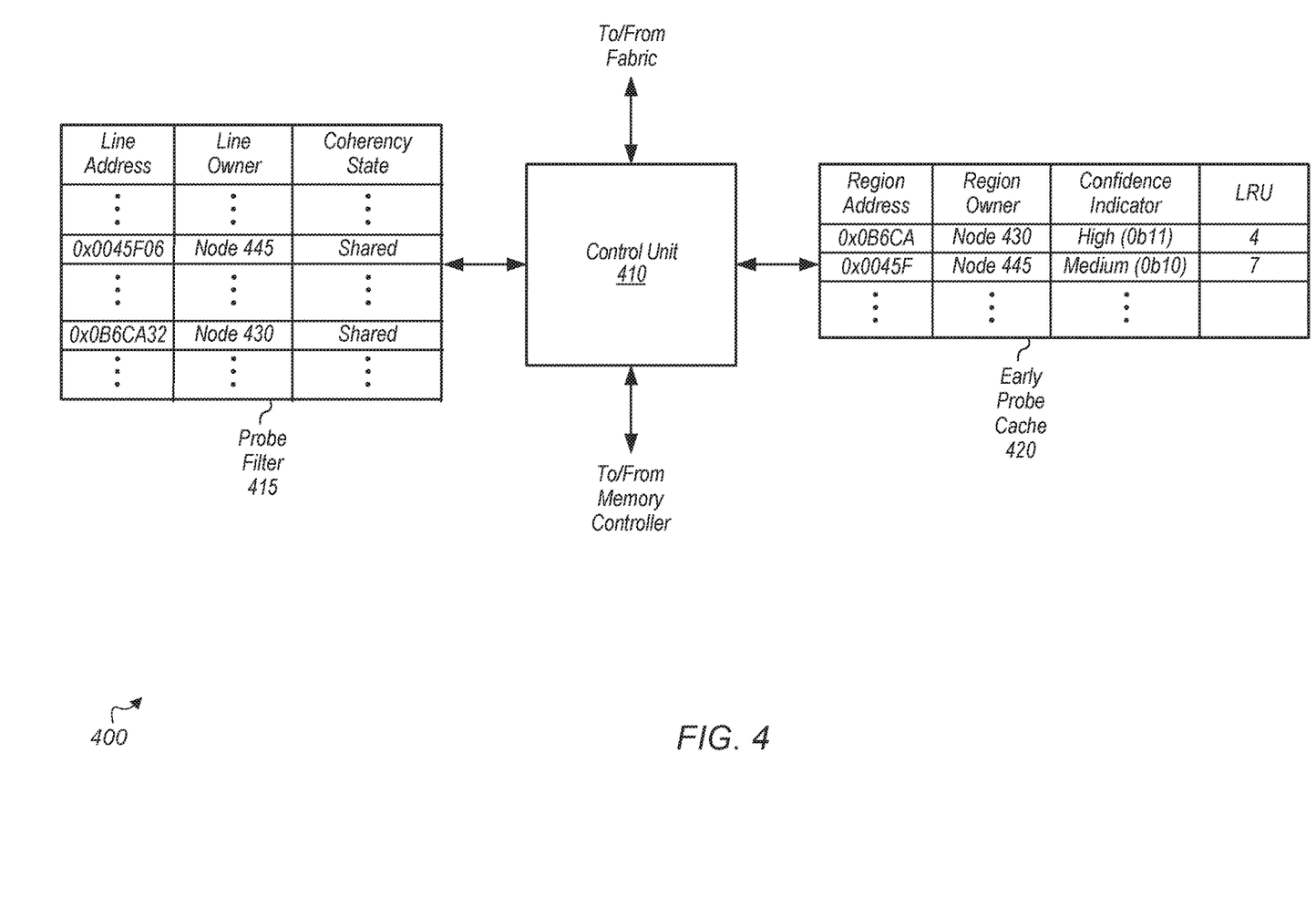
FIG. 4 is a block diagram of one embodiment of a coherent slave.

Turning now to FIG. 4, a block diagram of one embodiment of a coherent slave 400 is shown. In one embodiment, the logic of coherent slave 400 is included in coherent slaves 320A-B, 335A-B, and 355A-B of system 300 (of FIG. 3). Coherent slave 400 includes control unit 410 coupled to probe filter 415 and early probe cache 420. Control unit 410 is also coupled to an interconnect fabric and a memory controller. Control unit 410 can be implemented using any suitable combination of hardware and/or software. Control unit 410 is configured to receive memory requests from various CPUs via the interconnect fabric. The memory requests received by control unit 410 are conveyed to memory via the memory controller coupled to coherent slave 400. In one embodiment, when control unit 410 receives a given memory request, control unit 410 performs parallel lookups of early probe cache 420 and probe filter 415.

In one embodiment, early probe cache 420 is configured to cache the results of recent lookups to the probe filter 415 for shared regions. For example, when a lookup of the probe filter 415 is performed for a received memory request, a portion of the information retrieved from the lookup is retained and stored in early probe cache 420. For example, an ID of the owner of a cache line is retrieved from a lookup of probe filter 415, and an entry is created in early probe cache 420 for the address of the region in which this cache line falls. The node caching this cache line is stored as the region owner in the new entry in early probe cache 420.

Generally speaking, early probe cache 420 works on the principle that within a region of memory, the sharing behavior for all cache lines will likely be the same. In other words, if coherent slave 400 generated and sent a directed probe to node 445 for a first cache line inside a first region, then the probability of sending a directed probe to node 445 for a second cache line inside the first region is high as well. Since early probe cache 420 is smaller and faster than probe filter 415, early probe cache 420 ends up launching an early probe speculatively to the target node sooner than the lookup to probe filter 415 can complete. An example of a workload that would benefit from the launching of an early probe is a producer consumer scenario, where a producer stores to the lines within a region and then the consumers read from these lines. For all of the lines within the region, the home node ends up launching a probe to get the latest data from the producer.

As used herein, a "directed probe" refers to a probe generated based on a lookup to probe filter 415, with the probe sent to the owner of the cache line targeted by a memory request. An "early probe" refers to a probe generated based on a lookup to early probe cache 420, with the probe sent to the node identified as the owner of the region of the cache line targeted by the memory request. One way in which an early probe differs from a directed probe is that the early probe might be sent to the wrong target. Also, an early probe is sent several clock cycles earlier than the directed probe, so the early probe, if sent to the correct target, helps to reduce the latency of the processing of memory requests.

In one embodiment, each entry of early probe cache 420 includes a region address field, a region owner field, a confidence indicator field, and a least recently used (LRU) field. When a request is received by coherent slave 400, a lookup is performed of early probe cache 420 for the region address of the request, and a parallel lookup is performed of probe filter 415 for the cache line targeted by the request. If the lookup of early probe cache 420 results in a hit, then coherent slave 400 retrieves the confidence indicator from the matching entry. If the confidence counter exceeds a programmable threshold, then an early probe is launched targeting the region owner. Otherwise, if the confidence counter is less than or equal to the programmable threshold, then coherent slave 400 prevents an early probe from being launched and instead waits for the result of the lookup to probe filter 415.

At a later point in time, when the lookup to probe filter 415 completes, early probe cache 420 is updated with the results of the lookup to probe filter 415. If an entry is not present in early probe cache 420 for the region address of a shared region, then a new entry is created in early probe cache 420 by evicting an existing entry based on the LRU field. If an entry is already present in early probe cache 420 for the region address, then the LRU field is updated for this entry. If the cache line target retrieved from probe filter 415 is the same as the region owner identified in the early probe cache 420 entry, then the confidence indicator is incremented (i.e., increased by one). If the cache line target retrieved from probe filter 415 is not the same as the region owner identified in the early probe cache 420 entry, then the confidence indicator is decremented (i.e., decreased by one) or reset.

Once an early probe is launched by coherent slave 400, the corresponding demand probe generated after the lookup of probe filter 415 can be handled in different manners depending on the embodiment. In one embodiment, a demand probe is not launched if the early probe is to the correct target. In this embodiment, the early probe will cause the data to be retrieved from the target and returned to the requesting node. On the other hand, if the early probe is sent to the incorrect target, then a demand probe is sent to the correct target. In another embodiment, the early probe pulls data out of the cache subsystem of the target and then the data is stored in a temporary buffer. This data can be dropped if a timer expires before the demand probe arrives. In this embodiment, a demand probe is launched after the early probe, and the demand probe forwards the data pulled out of the cache subsystem to the requesting node.

Figure 5:
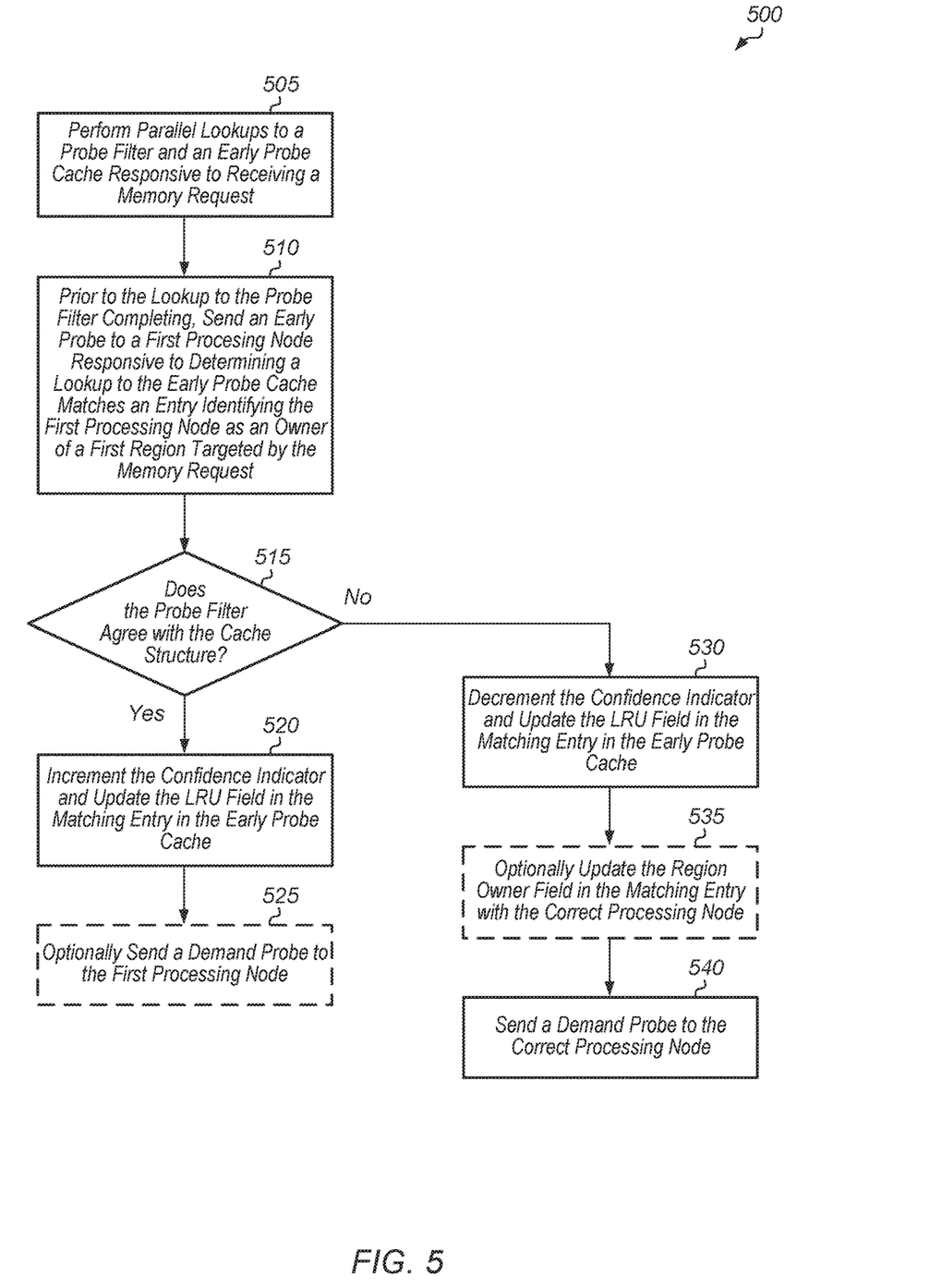
FIG. 5 is a generalized flow diagram illustrating one embodiment of a method for implementing an early probe mechanism.
Figure 6:
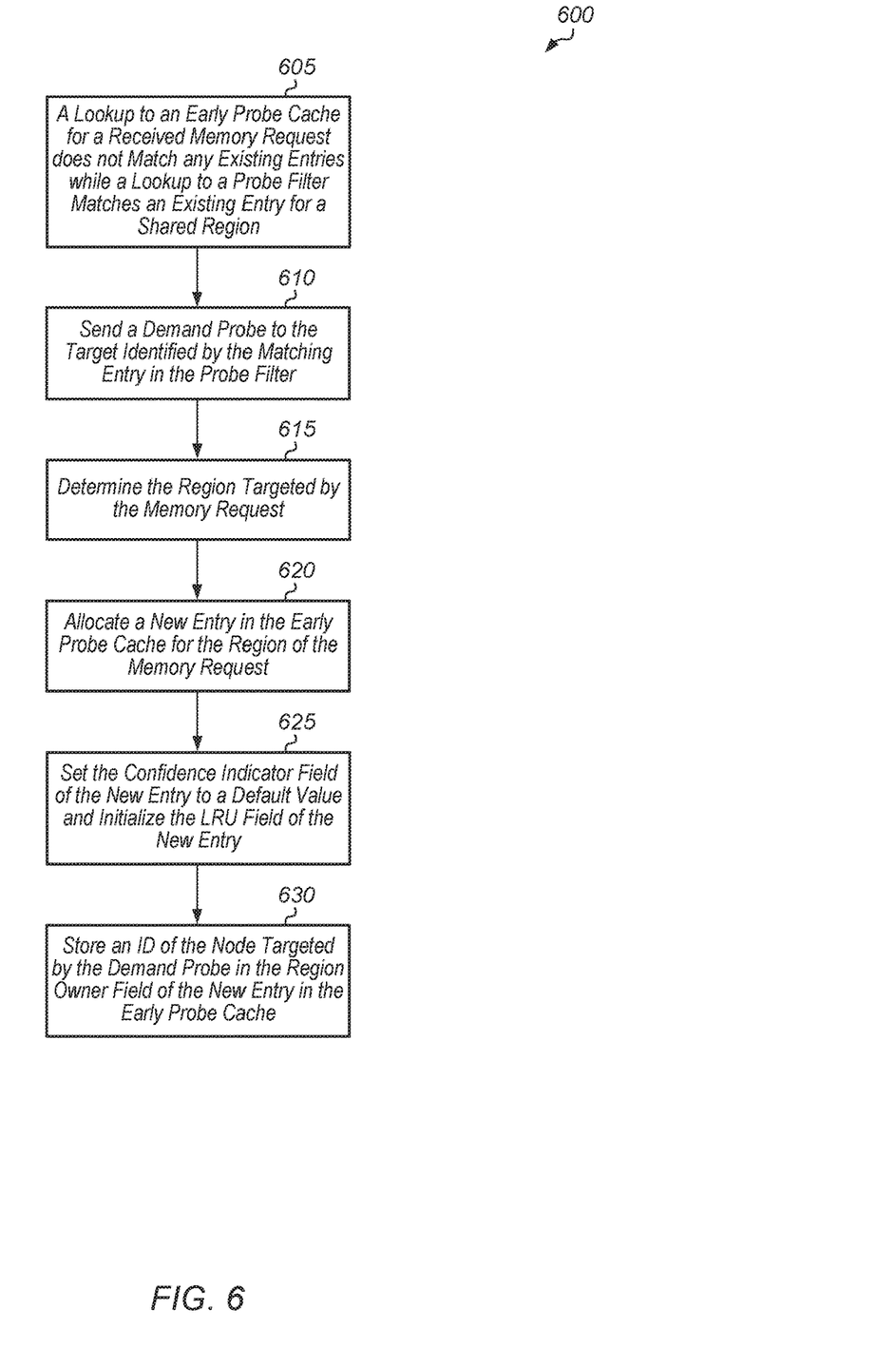
FIG. 6 is a generalized flow diagram illustrating one embodiment of a method for allocating region-based entries in an early probe cache for use in generating early probes.

Referring now to FIG. 5, one embodiment of a method 500 for implementing an early probe mechanism is shown. For purposes of discussion, the steps in this embodiment and those of FIG. 6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A coherent slave unit performs parallel lookups to a probe filter and an early probe cache responsive to receiving a memory request (block 505). Prior to the lookup to the probe filter completing, the coherent slave unit sends an early probe to a first processing node responsive to determining a lookup to the early probe cache matches an entry identifying the first processing node as an owner of a first region targeted by the memory request (block 510). It is assumed for the purposes of this discussion that the confidence indicator of the matching entry in the early probe cache is greater than a programmable threshold. If a lookup to the probe filter identifies the first processing node as an owner of the cache line targeted by the memory request (conditional block 515, "yes" leg), then the confidence indicator in the matching entry in the early probe cache is incremented and the LRU field is updated (block 520). A demand probe can optionally be sent to the first processing node, depending on the embodiment (block 525).

If a lookup to the probe filter identifies a different processing node as an owner of the cache line targeted by the memory request (conditional block 515, "no" leg), then the confidence indicator in the matching entry in the early probe cache is decremented and the LRU field is updated (block 530). Also, the region owner field in the matching entry in the early probe cache is optionally updated with the correct processing node (block 535). Additionally, a demand probe is sent to the correct processing node (block 540). After blocks 525 and 540, method 500 ends.

Turning now to FIG. 6, one embodiment of a method 600 for allocating region-based entries in an early probe cache for use in generating early probes is shown. A lookup to an early probe cache for a received memory request does not match any existing entries while a lookup to a probe filter matches an existing entry for a shared region (block 605). It is noted that the early probe cache lookup and probe filter lookup are performed in parallel by a coherent slave unit. In response to the lookup of the early probe cache missing and the lookup to the probe filter hitting, a demand probe is sent to the target identified by the matching entry in the probe filter (block 610). Also, the region targeted by the memory request is determined (block 615). Then, a new entry is allocated in the early probe cache for the region of the memory request (block 620). Any suitable eviction algorithm can be utilized to determine which entry to evict to make space for the new entry. The confidence indicator field of the new entry is set to a default value and the LRU field of the new entry is initialized (block 625). An ID of the node targeted by the demand probe is stored in the region owner field of the new entry in the early probe cache (block 630). Accordingly, for future memory requests targeting this region, an early probe will be sent to the same node based on this new entry in the early probe cache. After block 630, method 600 ends.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (MIA) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
 a plurality of processing nodes;
 a probe filter configured to track cache lines that are cached by the plurality of processing nodes;
 a memory controller; and
 a coherent slave unit coupled to the memory controller, wherein the coherent slave unit comprises an early probe cache configured to cache recent lookups to the probe filter, wherein the early probe cache stores entries on a region basis, wherein a region comprises a plurality of cache lines;

wherein the coherent slave unit is configured to:
perform parallel lookups to the probe filter and the early probe cache responsive to receiving a memory request;
retrieve an identifier of a first processing node from a first entry of the early probe cache responsive to a lookup of the early probe cache matching the first entry, wherein the first entry identifies the first processing node as an owner of a first region targeted by the memory request; and
send an early probe to the first processing node responsive to determining a confidence indicator of the first entry is greater than a threshold, wherein the early probe is sent prior to a lookup to the probe filter completing.

2. The system as recited in claim 1, wherein the coherent slave unit is further configured to increase the confidence indicator of the first entry responsive to determining the lookup to the probe filter identifies the first processing node as an owner of a cache line targeted by the memory request.

3. The system as recited in claim 2, wherein the coherent slave unit is further configured to decrease the confidence indicator of the first entry responsive to determining the lookup to the probe filter identifies a different processing node as an owner of a cache line targeted by the memory request.

4. The system as recited in claim 1, wherein responsive to the lookup to the early probe cache missing and the lookup to the probe filter hitting an entry corresponding to a shared region, the coherent slave unit is configured to allocate a new entry for the memory request in the early probe cache.

5. The system as recited in claim 4, wherein the coherent slave unit is further configured to:
determine a region that includes the cache line targeted by the memory request;
store an address of the region in a region address field of the new entry of the early probe cache;
extract an identifier (ID) of an owner of the cache line from a matching entry of the probe filter; and
store the ID in a region owner field of the new entry in the early probe cache.

6. The system as recited in claim 1, wherein the first processing node is configured to:
receive the early probe;
retrieve data targeted by the early probe if the data is present in a cache subsystem of the first processing node; and
return the data to a requesting processing node.

7. The system as recited in claim 1, wherein the first processing node is configured to:
receive the early probe;
retrieve data targeted by the early probe if the data is present in a cache subsystem of the first processing node; and
buffer the data and wait for a corresponding demand probe to be received.

8. A method comprising:
performing parallel lookups to a probe filter and an early probe cache responsive to receiving a memory request;
retrieve an identifier of a first processing node from a first entry of the early probe cache responsive to a lookup of the early probe cache matching the first entry, wherein the first entry identifies the first processing node as an owner of a first region targeted by the memory request; and
send an early probe to the first processing node responsive to determining a confidence indicator of the first entry is greater than a threshold, wherein the early probe is sent prior to a lookup to the probe filter completing.

9. The method as recited in claim 8, further comprising increasing the confidence indicator of the first entry responsive to determining the lookup to the probe filter identifies the first processing node as an owner of a cache line targeted by the memory request.

10. The method as recited in claim 9, further comprising decreasing the confidence indicator of the first entry responsive to determining the lookup to the probe filter identifies a different processing node as an owner of a cache line targeted by the memory request.

11. The method as recited in claim 8, wherein responsive to the lookup to the early probe cache missing and the lookup to the probe filter hitting an entry corresponding to a shared region, the method further comprising allocating a new entry for the memory request in the early probe cache.

12. The method as recited in claim 11, further comprising:
determining a region that includes the cache line targeted by the memory request;
storing an address of the region in a region address field of the new entry of the early probe cache;
extracting an identifier (ID) of an owner of the cache line from a matching entry of the probe filter; and
storing the ID in a region owner field of the new entry in the early probe cache.

13. The method as recited in claim 8, further comprising:
receiving the early probe at the first processing node;
retrieving data targeted by the early probe if the data is present in a cache subsystem of the first processing node; and
returning the data to a requesting processing node.

14. The method as recited in claim 8, further comprising:
receiving the early probe at the first processing node;
retrieving data targeted by the early probe if the data is present in a cache subsystem of the first processing node; and
buffering the data and waiting for a corresponding demand probe to be received.

15. An apparatus comprising:
a probe filter configured to track cache lines that are cached by a plurality of processing nodes; and
a coherent slave unit comprising an early probe cache configured to cache recent lookups to the probe filter, wherein the early probe cache stores entries on a region basis, wherein a region comprises a plurality of cache lines, and wherein the coherent slave unit is configured to:
perform parallel lookups to the probe filter and the early probe cache responsive to receiving a memory request;
retrieve an identifier of a first processing node from a first entry of the early probe cache responsive to a lookup of the early probe cache matching the first entry, wherein the first entry identifies the first processing node as an owner of a first region targeted by the memory request; and
send an early probe to the first processing node responsive to determining a confidence indicator of the first entry is greater than a threshold, wherein the early probe is sent prior to a lookup to the probe filter completing.

16. The apparatus as recited in claim 15, wherein the coherent slave unit is further configured to increase the confidence indicator of the first entry responsive to determining the lookup to the probe filter identifies the first processing node as an owner of a cache line targeted by the memory request.

17. The apparatus as recited in claim 16, wherein the coherent slave unit is further configured to decrease the confidence indicator of the first entry responsive to determining the lookup to the probe filter identifies a different processing node as an owner of a cache line targeted by the memory request.

18. The apparatus as recited in claim 15, wherein responsive to the lookup to the early probe cache missing and the lookup to the probe filter hitting an entry corresponding to a shared region, the coherent slave unit is configured to allocate a new entry for the memory request in the early probe cache.

19. The apparatus as recited in claim 18, wherein the coherent slave unit is configured to:
    determine a region that includes the cache line targeted by the memory request;
    store an address of the region in a region address field of the new entry of the early probe cache;
    extract an identifier (ID) of an owner of the cache line from a matching entry of the probe filter; and
    store the ID in a region owner field of the new entry in the early probe cache.

20. The apparatus as recited in claim 15, wherein the coherent slave unit is further configured to send a demand probe to a second processing node responsive to determining the lookup to the probe filter matches on an entry identifying the second processing node as an owner of a cache line targeted by the memory request.

* * * * *